(12) United States Patent
Yao

(10) Patent No.: US 11,073,438 B2
(45) Date of Patent: Jul. 27, 2021

(54) MANIFOLD FOR MEASURING DIFFERENTIAL PRESSURE ON A GAS METER

(71) Applicant: Natural Gas Solutions North America, LLC, Houston, TX (US)

(72) Inventor: Richard Jin Yao, The Woodlands, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 482 days.

(21) Appl. No.: 16/147,203

(22) Filed: Sep. 28, 2018

(65) Prior Publication Data

US 2020/0103300 A1 Apr. 2, 2020

(51) Int. Cl.
| | | |
|---|---|---|
| *G01L 13/00* | (2006.01) | |
| *G01L 19/00* | (2006.01) | |
| *G01L 19/14* | (2006.01) | |
| *G01D 4/02* | (2006.01) | |

(52) U.S. Cl.
CPC ............ *G01L 19/0092* (2013.01); *G01D 4/02* (2013.01); *G01L 13/00* (2013.01); *G01L 19/141* (2013.01)

(58) Field of Classification Search
CPC ... G01L 19/0092; G01L 13/00; G01L 19/141; G01D 4/02
See application file for complete search history.

(56) References Cited

U.S. PATENT DOCUMENTS

| | | | |
|---|---|---|---|
| 4,466,920 A | 8/1984 | Frick | |
| 6,349,735 B2 | 2/2002 | Gul | |
| 7,212,953 B1 | 5/2007 | Artiuch | |
| 7,231,831 B1 * | 6/2007 | Lancaster | G01L 19/0015 137/15.09 |
| 7,765,978 B2 | 8/2010 | Ruesch et al. | |
| 8,327,880 B2 * | 12/2012 | Eccles | F16K 37/0066 137/595 |
| 9,335,005 B2 * | 5/2016 | Galle | F24H 9/144 |
| 2001/0039964 A1 * | 11/2001 | Gul | G01L 19/0015 137/360 |
| 2007/0163362 A1 * | 7/2007 | Wehrs | G01F 1/36 73/861.42 |

* cited by examiner

*Primary Examiner* — Jamel E Williams
(74) *Attorney, Agent, or Firm* — Paul Frank + Collins P.C.

(57) ABSTRACT

A manifold assembly configured to measure differential pressure of fluid. The manifold assembly may have a monolithic body with an internally drilled fluid pathway. The body supports a differential pressure transducer that communicates, on either end, with the internally drilled fluid pathway. This configuration can generate data that defines pressure drop across impellers or other mechanisms on metrology hardware (or "gas meters"). Utilities can use this data to diagnose health or other conditions on the gas meter in the field.

20 Claims, 10 Drawing Sheets

MANIFOLD FOR MEASURING DIFFERENTIAL PRESSURE ON A GAS METER

BACKGROUND

Utility companies deliver a wide range of resources to customers. These resources include fuel gas that customers may use for heat, hot water, and cooking. It is normal for the utility to install its own equipment on site to measure consumption of the fuel gas. This equipment often includes a gas meter and a pressure regulator that work together to determine an amount of fuel gas the customer uses (so the utility can provide an accurate bill). Likely, these measurement are subject to certain "legal metrology" standards that regulatory bodies promulgate under authority or legal framework of a given country or territory. These standards may be in place to protect public interests, for example, to provide consumer protections for metering and billing use of fuel. These protections may set definitions for units of measure, realization of these units of measure in practice, application of traceability for linking measurement of the units made in practice to the standards and, importantly, ensure accuracy of measurements.

SUMMARY

The subject matter of this disclosure relates to improvements to ensure that metrology hardware meets these standards. Of particular interest herein are embodiments that can account for flow parameters of the resource as it transits through the metrology hardware. These embodiments may employ a manifold that attaches to the outside of the metrology hardware. The resource can flow into the manifold, which in turn directs the resource in contact with sensors, for example, a differential pressure sensor and an absolute pressure sensor. For fuel gas, these sensors may generate data that is useful to ensure accurate and reliable measurement of (and bills for) customer consumption. This feature is particularly important in environments that subject the metrology hardware to temperature and pressure variations that change properties of the resource, namely, increases and decreases in density that can frustrate accurate measurement of consumer consumption.

DRAWINGS

Reference is now made briefly to the accompanying drawings, in which.

Figure 1:
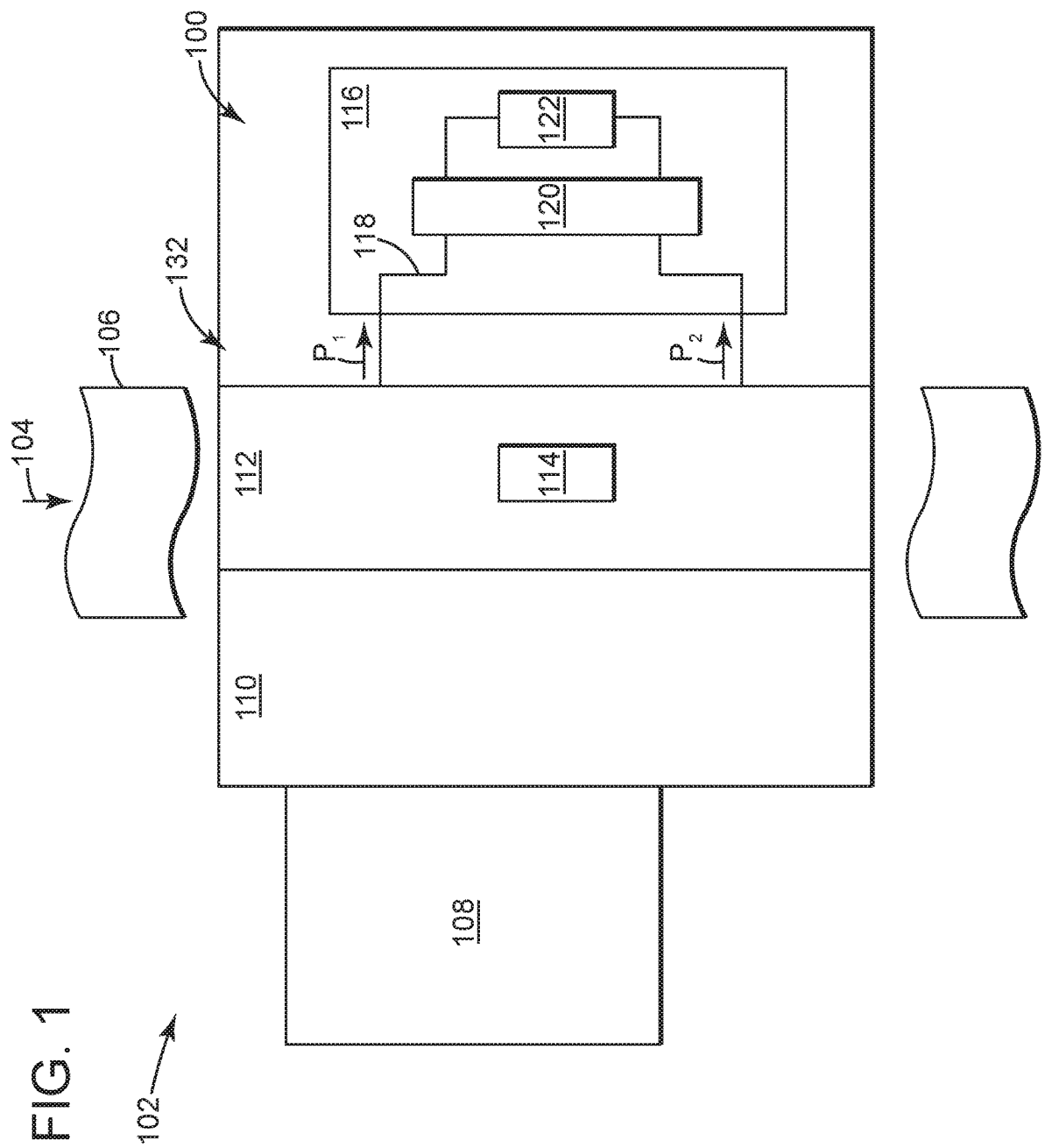
FIG. 1 depicts a schematic diagram of an exemplary embodiment of manifold for measuring differential pressure on a gas meter.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below highlights embodiments of gas meters and related metrology hardware. These embodiments employ a fluid circuit that extracts or samples fuel gas that flows inside the "metering" structure, for example, proximate impellers on a gas meter. This fluid circuit may direct the samples to devices, like sensors, that can measure certain parameters of flow, material properties, or like variables that might be useful to evaluate operation of the device. Utilities may leverage the data that results from these sensors to ensure their device continues to operate with accuracy that meets regulatory frameworks, as well as to identify potential problems on the device in the field. Other embodiments are within the scope of this disclosure.

FIG. 1 depicts a schematic diagram of an exemplary embodiment of a manifold 100. This embodiment is resident on metrology hardware, identified generally by the numeral 102. The metrology hardware 102 may embody a device that can quantify a value that defines flow parameters of resource 104 in conduit 106. This device may include and indexing unit 108 and a meter unit 110 that couples in-line with the conduit 106. The meter body 110 may form a flow path 112 that directs resource 104 to a flow mechanism 114. As also shown, the manifold 100 may include a manifold body 116 that couples with the flow path 112 upstream and downstream of the flow mechanism 114. The manifold body 116 may form a fluid circuit that directs resource 104 through a valve unit 118 to a sensor unit 120.

Broadly, the manifold 100 may be configured with compact, integrated construction. These configurations may embody devices that integrate parts to avoid use of "plumbing" components, like singular pipes (or tubes or conduits), valves, and fittings. The resulting device is effectively free of leaks or leak points that might allow resource 104 to escape to environment. By reducing parts, the device also is much more robust and easy to assemble than conventional plumbed designs. This feature prevents tampering and damage that can occur in transit, at installation, and during prolonged use in the field. The compact design further eases maintenance to remove and replace the device on to the metrology hardware 102, which may be required to update, fix, or replace hardware (e.g., sensors) on the manifold 100 in the field.

The metrology hardware 102 may be configured to measure or "meter" flow of materials. These configurations often find use to quantify demand for resource 104 at residential and commercial locations. It is also possible that metrology hardware 102 find use in custody transfer or like inventory management applications as well. For purposes of this discussion, resource 104 may be fuel gas (like natural gas); but hardware 102 may measure consumption of other solid, fluids (e.g., water), and solid-fluid mixes. In the field, the conduit 106 may be part of a distribution network that distributes fuel gas 104 to customers. The distribution network may employ intricate networks of piping that cover vast areas of towns or cities with hundreds or thousands customers. In most cases, utilities maintain responsibility for upkeep, maintenance, and repair of the metrology hardware 102. The manifold 100 may help to facilitate these tasks because it provides data (e.g., differential pressure) that the utility can use to diagnose problematic operation or characterize overall health of the metrology hardware 102.

The units 108, 110 may be configured to cooperate to generate data that defines consumption of fuel gas 104. These configurations may embody standalone devices that connect with one another to exchange data or other information. Electronics on the indexing unit 108 may convert movement (or, generally, data from the meter unit 110) into values for volumetric flow, often taking into account (or "correcting" for) variations in ambient temperature, pressure, and differential pressure to ensure accurate and reliable values for billing customers. The meter unit 110 may include devices, like the flow mechanism 112, that can generate indicators to quantify flow of fuel gas 104 through the device (and onto the customer). These devices may employ sensors (e.g., pressure sensors) in lieu of any mechanisms to measure and quantify values for volumetric flow. However, more typical devices may employ mechanics and mechanisms, like counter-rotating impellers or diaphragms that may move in response to flow to meter a precise volume of the fuel gas 104.

The manifold body 116 may be configured to support components that can measure differential pressure across the mechanism in the meter unit 110. These configurations may leverage a unitary or monolithic structure with internal features (like apertures, holes, or chambers) that form the fluid circuit. This construction may leverage materials that are compatible with fuel gas 104 (or, more generally, with material properties of any resource 104). These materials may also need to withstand particularly harsh weather or temperature variations in the field. Preference may be given to metals like aluminum or steel, which can be machined or cast to form the structure as a single, unitary or (monolithic) piece; however, this disclosure does contemplate use of multiple, separate pieces that weld or fasten together. The valve unit 118 may include devices that integrate into these internal features. These devices allow an end user (e.g., a technician) to regulate flow of resource 104 through the fluid circuit. In one implementation, the sensor unit 120 may embody a pressure transducer; but other devices that can measure differential pressure may suffice as well.

Figure 2:
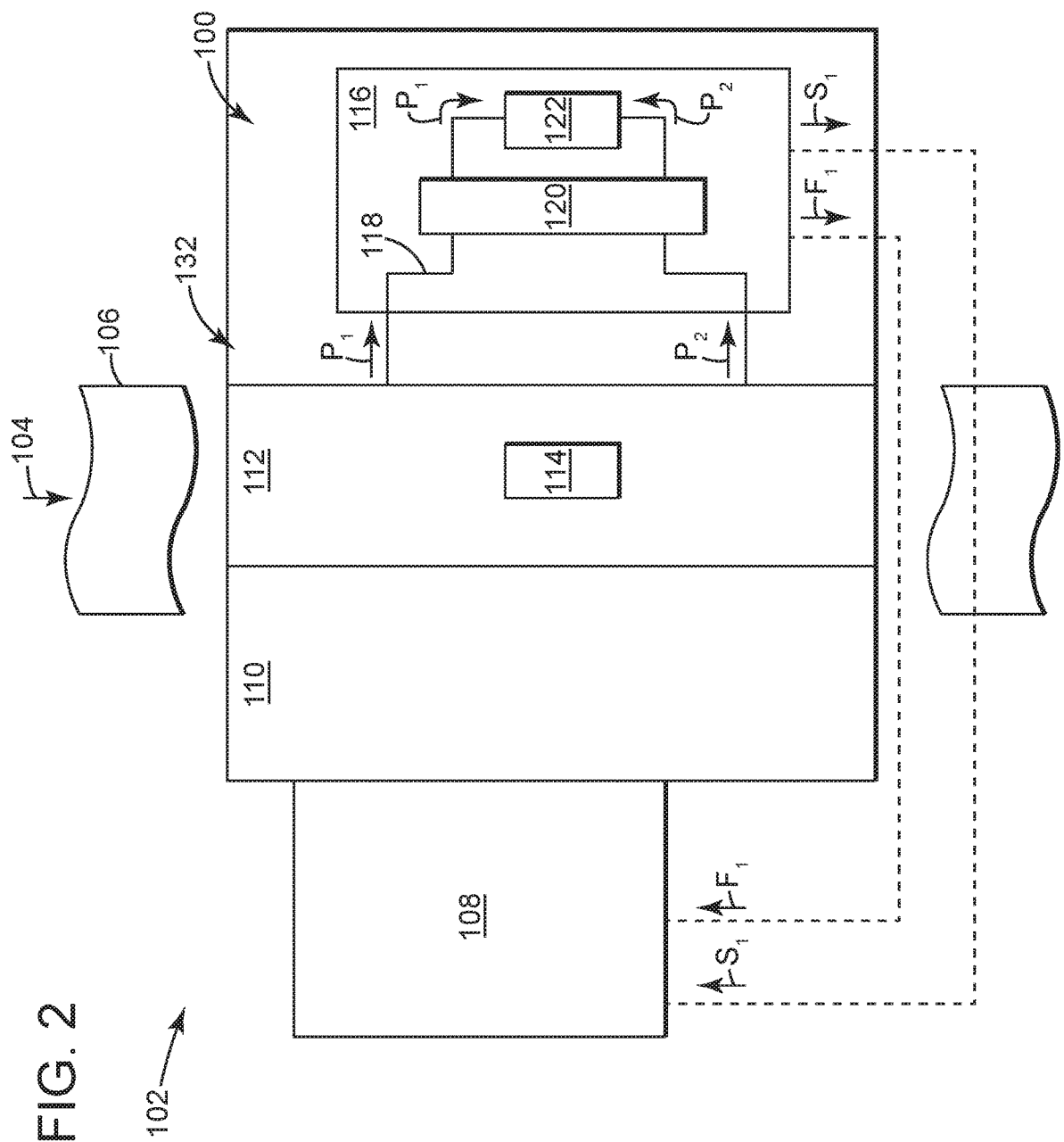
FIG. 2 depicts a schematic diagram of the manifold of FIG. 1.

FIG. 2 depicts a schematic diagram of an example of the manifold 100 of FIG. 1. The manifold 100 may couple with the indexing unit 108 to exchange signals, including a sensor signal $S_1$ and a fluid signal $F_1$. In operation, fuel gas 104 may enter the fluid circuit as a pair of streams at a first pressure ($P_1$) and a second pressure ($P_2$). The pressures $P_1$, $P_2$ correspond with pressure of fuel gas 104 upstream and downstream of the flow mechanism 114, respectively. Often, pressure $P_1$ is greater than pressure $P_2$ due to pressure drop across the flow mechanism 114. The fluid circuit directs the streams $P_1$, $P_2$ to the pressure transducer 120, which generates the sensor signal $S_1$. The fluid signal $F_1$ may correspond with the higher pressure stream $P_1$. The indexing unit 108 may include a pressure sensor that can measure pressure of the fluid signal $F_1$. In one implementation, the indexing unit 108 may be outfit to transmit or broadcast data that defines differential pressure, for example, using automatic meter reading (AMR) or other wired or wireless technology. The utility may use this data in diagnostics to monitor health of the gas meter 102.

The discussion now turns to describe an exemplary structure for the manifold body and its components. This structure is useful to facilitate measurement of differential pressure and flow control. Other aspects of the design may benefit manufacture, assembly, or safety. This disclosure contemplates variations in the design, however, that also promote these benefits, but which might employ different variations of concepts herein. For example, certain parts may lend themselves to other geometry or shapes, or require manufacture of features to facilitate proper fit or function as part of the manifold 100 or cooperation with other parts (e.g., valves 118, sensor unit 120) on the device.

Figure 3:
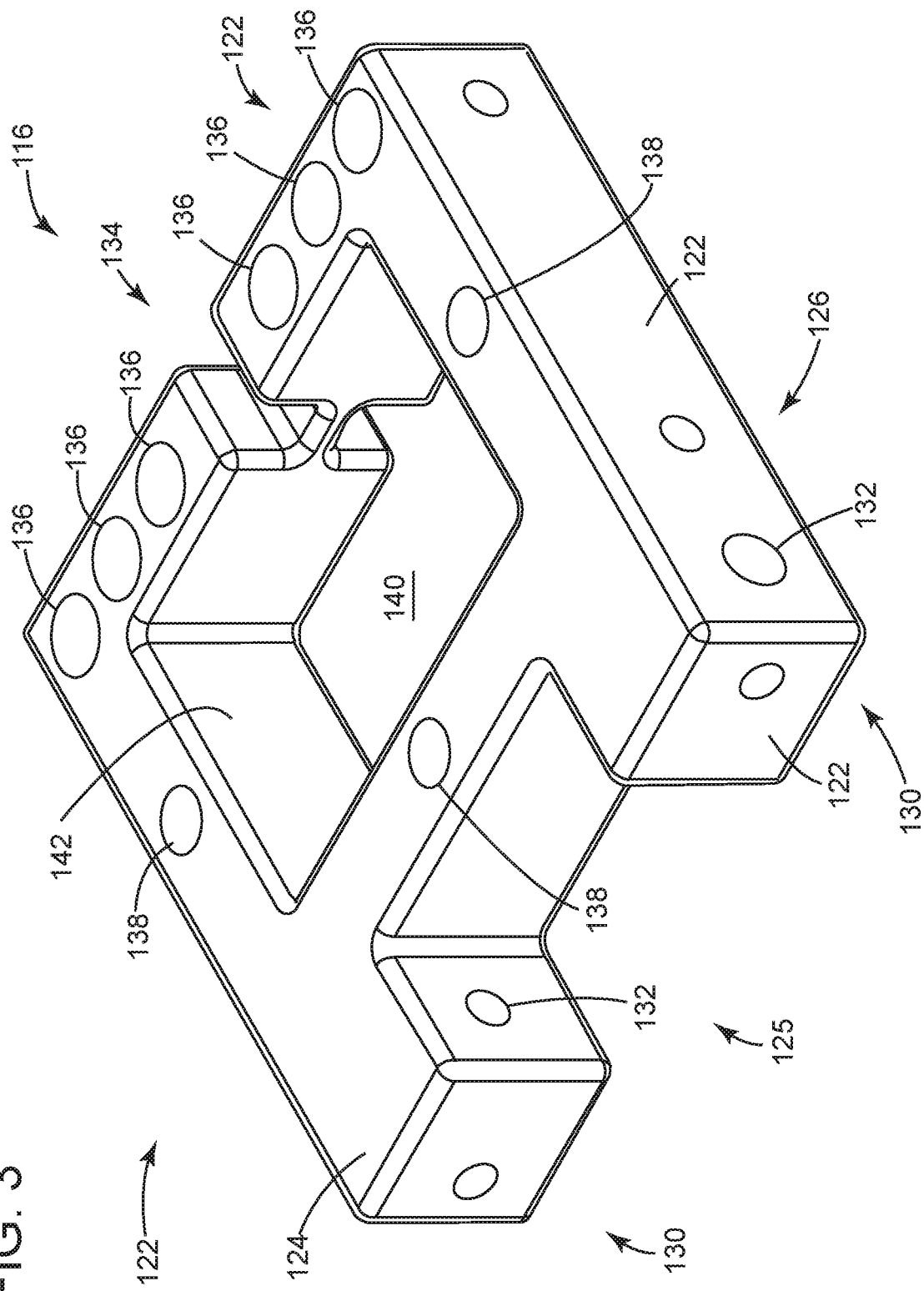
FIG. 3 depicts a perspective view from the front of exemplary structure for use on the manifold of FIG. 1.
Figure 4:
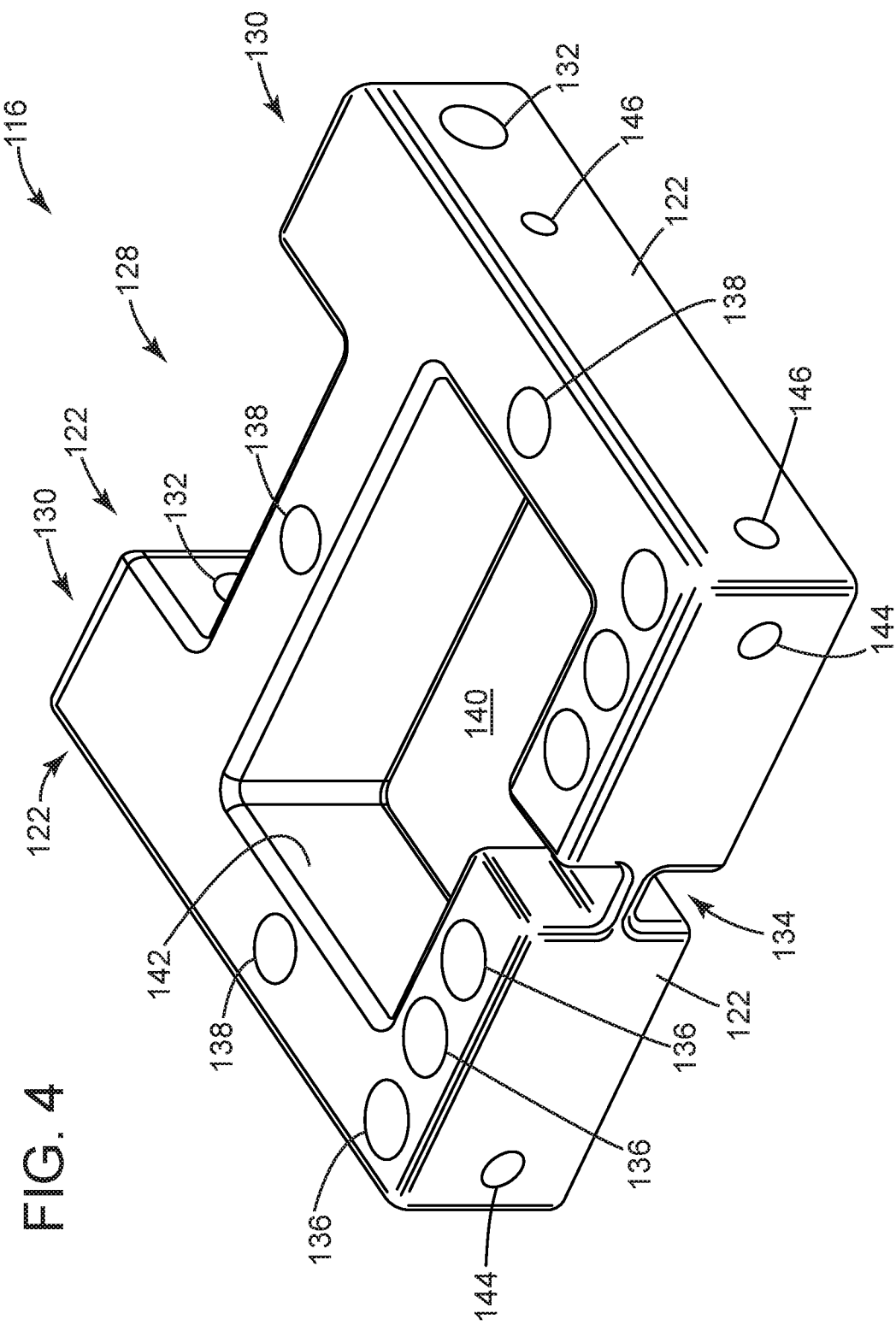
FIG. 4 depicts a perspective view of the back of the structure of FIG. 3.

FIGS. 3 and 4 depict a perspective view of exemplary structure for the manifold body 116 for use on the manifold 100 of FIG. 1. Referring first to FIG. 3, this structure may form a square or rectangle with four sides 122, a top 124, and a bottom 126. On one end, the manifold body 116 may include a notch 128 that forms opposing arms 130. Spacing between the opposing arms 130 may accommodate the pressure transducer 120. In this regard, each of the arms 130 may have lateral openings 132 that penetrate from the sides 122 to the exposed interior of the notch 128. On the opposite end, the manifold body 116 may be configured to direct flow of fuel gas 104 into the fluid circuit as the streams $P_1$, $P_2$. These configurations may have a necked-down portion 134 that narrows in width from the top 124 or the bottom 126, or both. One or more apertures 136 may populate the structure on either side of the necked-down portion 134. The apertures 136 may form through-holes that penetrate entirely through the material, e.g., from top 124 to bottom 126. Pitch of the through-holes 136 is meant to align at least two (one on either side of the necked-down portion 134) with openings on the meter unit 110. This feature accommodates different models, meter sizes, and port locations on the meter unit 110.

The manifold body 116 may have other features to integrate functionality of the manifold 100. These features may include valve openings 138 that populate space about (or around) the periphery of a central opening 140. The openings 138 may receive or interface with parts of the valve unit 118. The central opening 140 may have parallel, interior sides 142, like might be found on square or rectangle shapes. But the interior sides 142 may be arcuate, annular, or circular as well. The shape may function as a window so as not to obstruct visual inspection of portions on the meter unit 110, for example, portions that include nameplates, labels, or other identifying information for the device.

As best shown in FIG. 4, the manifold body 116 may also include features that form the fluid circuit internal to its structure. These features may include a pair of longitudinal apertures 144 in the side 122. The longitudinal apertures 144 may align with the through-holes 136 that are proximate corners formed by adjacent sides 122 of the manifold body 116. The manifold body 116 may also include lateral apertures 146 that intersect with the longitudinal apertures 144 and with the through-holes 136.

Figure 5:
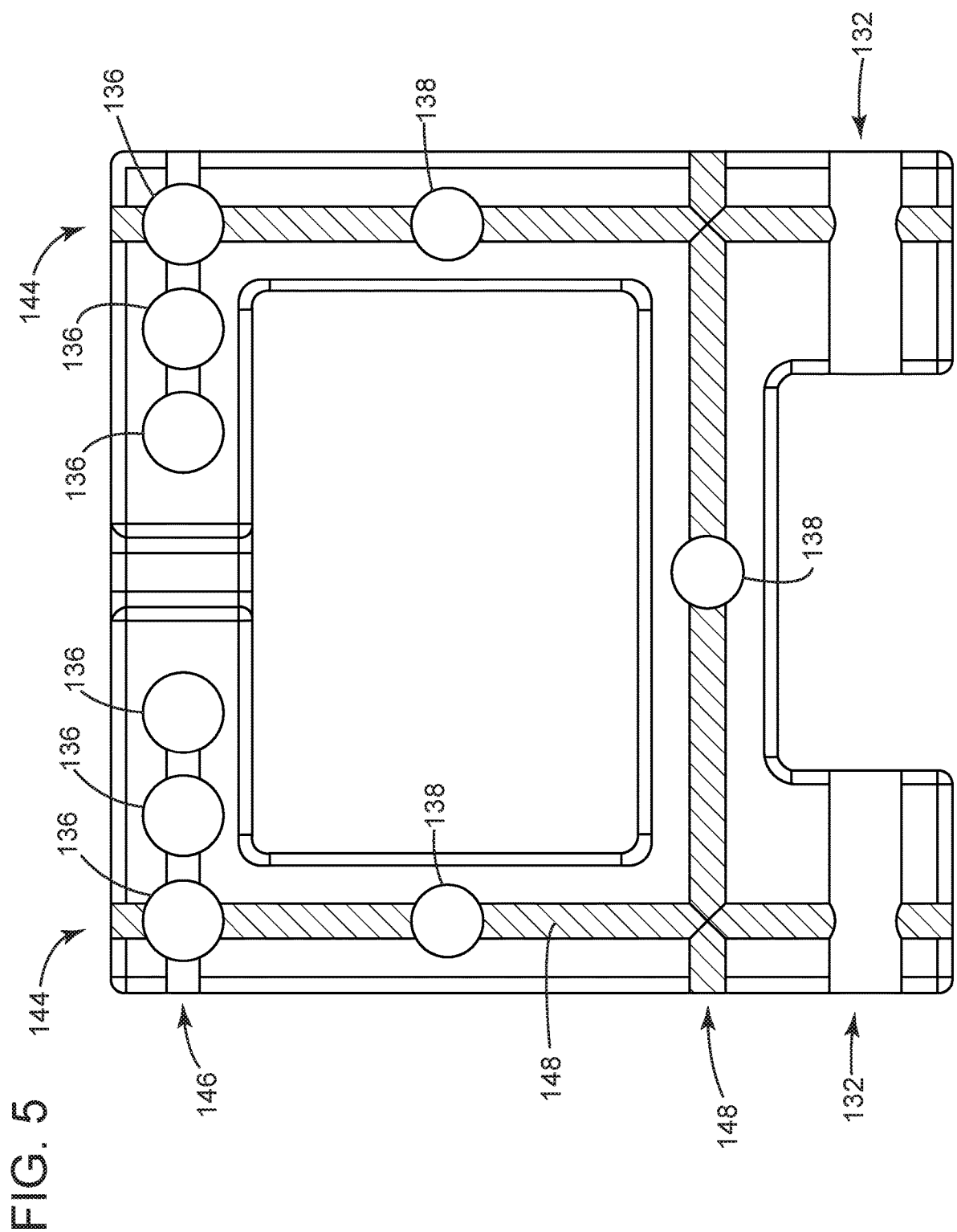
FIG. 5 depicts a plan view of the cross-section of the structure of FIGS. 3 and 4.

FIG. 5 depicts a plan view of the cross-section of the manifold body 116 of FIGS. 3 and 4. The apertures 144, 146 may form the fluid circuit, enumerated 148 and shown in cross-hatch as well. The fluid circuit 148 forms an internal pathway to the manifold body 116 to avoid unnecessary piping and fittings that may leak or deteriorate over time. This internal pathway may place the lateral openings 132, the apertures 136, and the valve openings 138 in contiguous flow connection to allow fuel gas 104 to flow to the notch 128.

Figure 6:
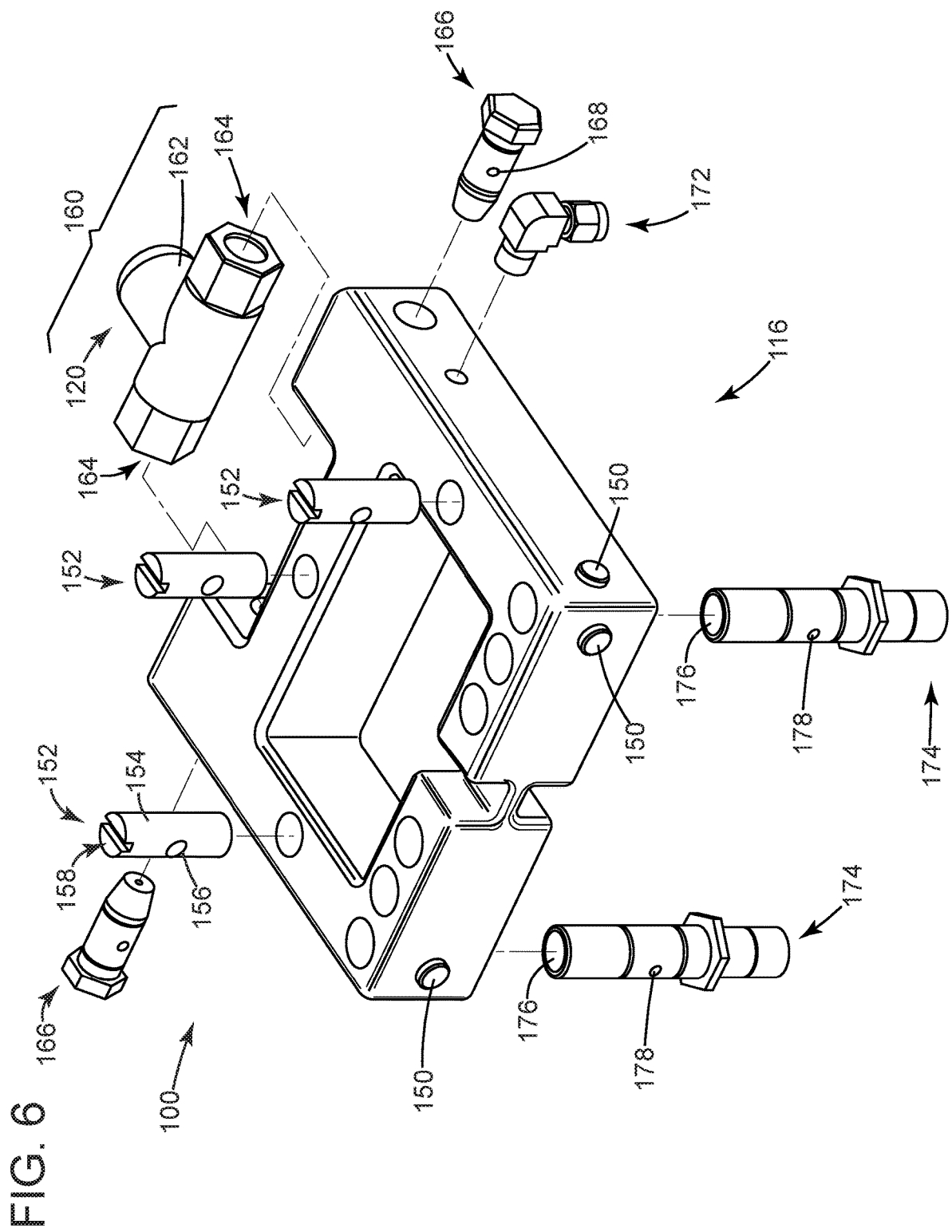
FIG. 6 depicts a perspective view of an example of the manifold of FIG. 1 show in exploded-assembly form.

FIG. 6 depicts a perspective view of exemplary structure for the manifold 100 of FIG. 1 in exploded form. This structure may include plugs 150 that insert into the manifold body 116 to cover or "plug" one or more of the apertures 144, 146. Use of the plugs 150 may not be necessary, however, in some instantiations of the design; for example, additive manufacturing of the manifold body 116 may foreclose the need for "cross-drilling" or secondary operations to create the apertures 144, 146. Further shown in FIG. 6, the valve unit 118 may include valves 152, shown here with an elongate, cylindrical body 154 with a through-hole 156 and a slotted-top 158. The pressure transducer 120 may be part of a transducer assembly 160, essentially a body 162 with inlets 164. The assembly 160 may also include fasteners 166, each having holes 168 on its cylindrical surface and its distal end. The holes 168 connect internally to allow fuel gas 104 to pass therethrough. As also shown, the manifold 100 may include an outlet fitting 172 and inlet fittings 174 with axial aperture 176 and radial aperture 178.

Figure 7:
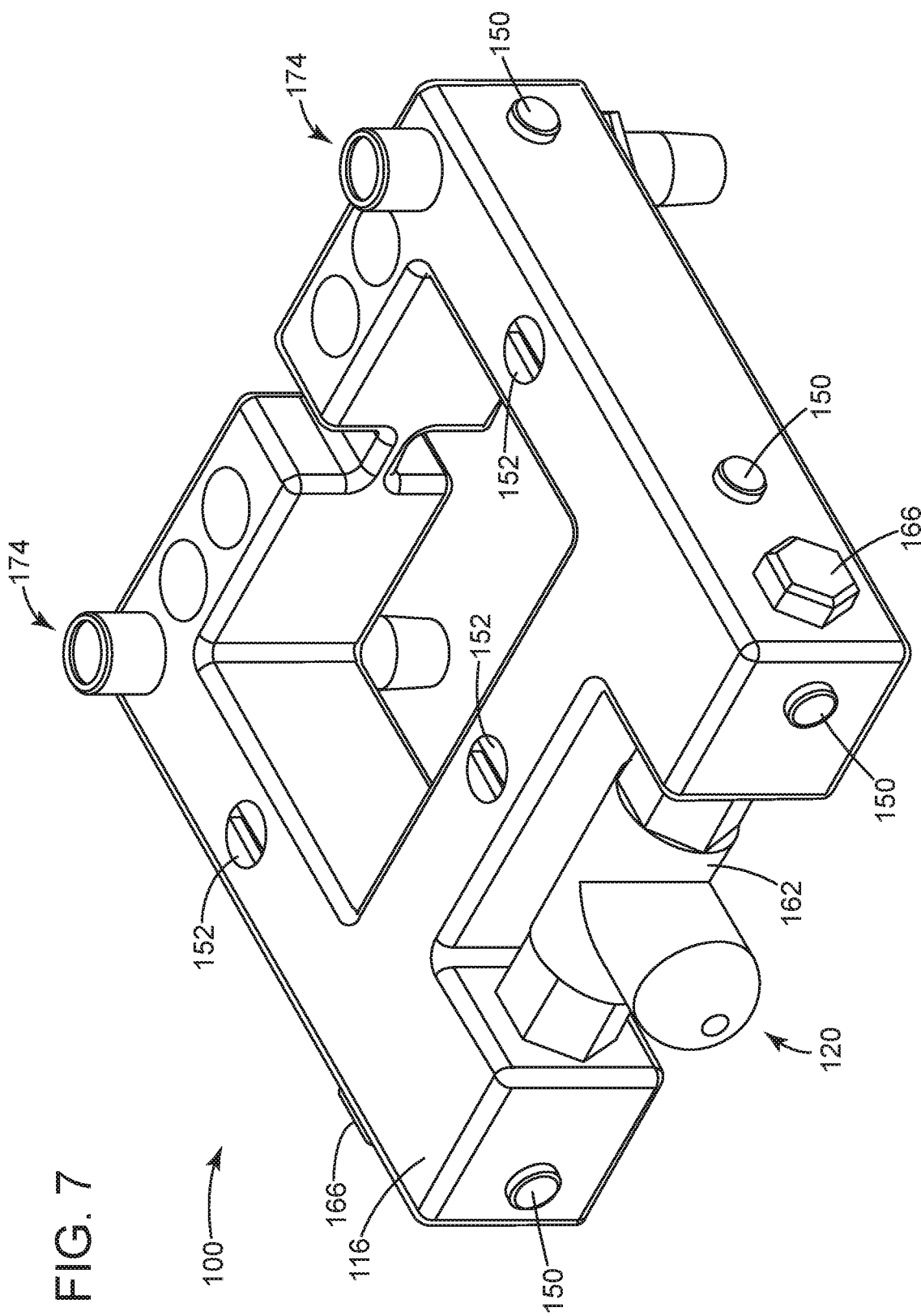
FIG. 7 depicts a perspective view from the front of the manifold of FIG. 6 in assembled form.
Figure 8:
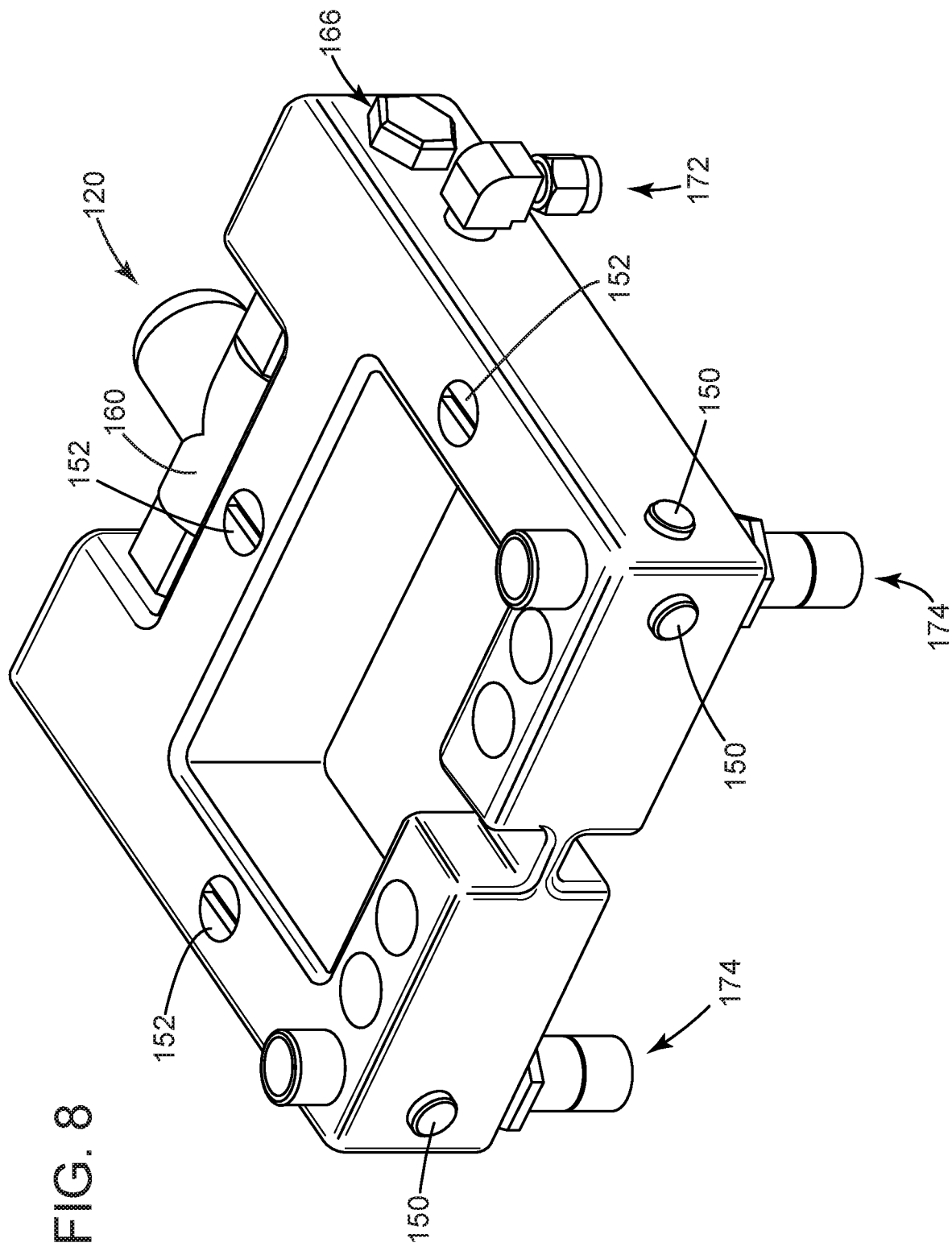
FIG. 8 depicts a perspective view from the back of the manifold of FIG. 6 in assembled form.

FIGS. 7 and 8 depict a perspective view of the example of FIG. 6 in assembled form. The transducer assembly 160 fits into the notch 128. Fasteners 166 can insert into lateral openings 132 to engage with the inlets 164. Care should be taken to ensure that the hole 168 on the cylindrical surface align properly with the longitudinal apertures 144 to allow proper flow of fuel gas 104 to the pressure transducer 120. As also shown, the cylindrical body 154 of the valves 152 insert into the valve openings 138. The slotted top 158 may remain exposed at the top 124 of the manifold body 116, which allows an end user to manipulate the location of the through-hole 156 relative to the longitudinal aperture 144. This location may allow or prevent fuel gas 104 downstream of the through-hole 156. With reference to FIG. 8, the outlet fitting 172 may inert into the "forward" lateral aperture 146. The outlet fitting 174 may couple with a pressure sensor inside of the indexing unit 108 to measure pressure of fuel gas 104 that upstream of the flow mechanism 114. At one end, the inlet fittings 174 may insert into the through-holes 136, for example, into one of the through-holes 136 found on each side of the necked-down portion 134. Selection of the through-holes 136 may consider align with features on the meter body 110, as noted above. The assembly may benefit from plugs (not shown) that plug any unused through-holes 136 on the manifold body 116 to properly seal the fluid circuit 148.

Figure 9:
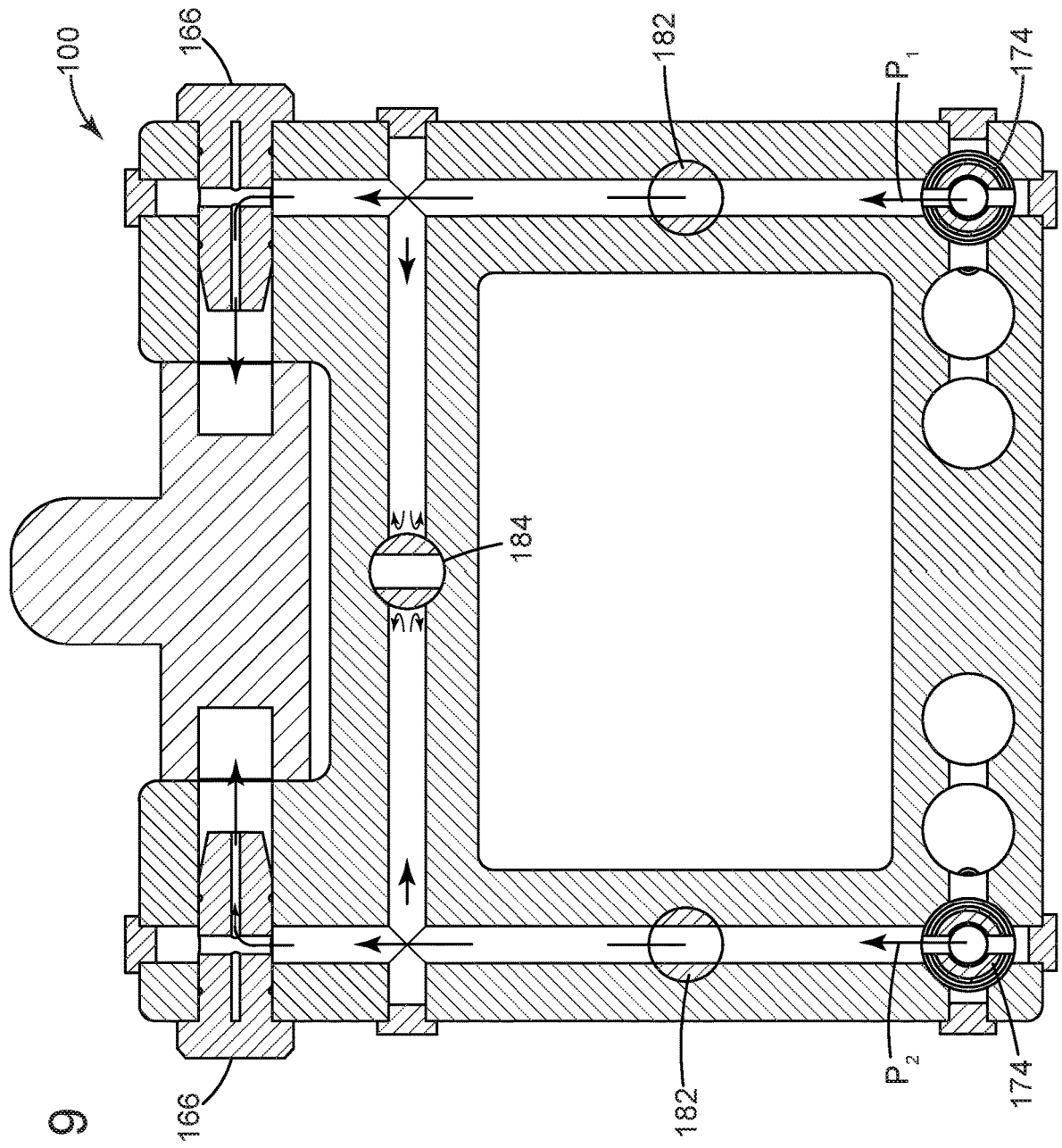
FIG. 9 depicts a plan view of the cross-section of the manifold of FIGS. 7 and 8.

FIG. 9 depicts a plan view of an example of the cross-section of the manifold 100 of FIGS. 6 and 7. This example includes a flow pattern 180 for a configuration of valves 152. This configuration directs streams $P_1$, $P_2$ of fuel gas 104 to the transducer assembly 160. The streams $P_1$, $P_2$ enter through the inlet fittings 174, which may couple directly to corresponding fittings (or other devices) on the meter unit 110. "Shut-off" valves 182 can be arranged to align the through-hole 156 with the longitudinal apertures 144. "Equalizing" valve 184 can be arranged to misalign the through-hole 170 in the lateral aperture 150. This arrangement of valves 182, 184 directs flow of the streams $S_1$, $S_2$ through the fasteners 166 and into the transducer assembly 160. For servicing and maintenance, the valves 182 may be closed and the valve 184 opened to equalize pressure across the fluid circuit 148. The technician can then remove the transducer assembly 160 as desired.

Figure 10:
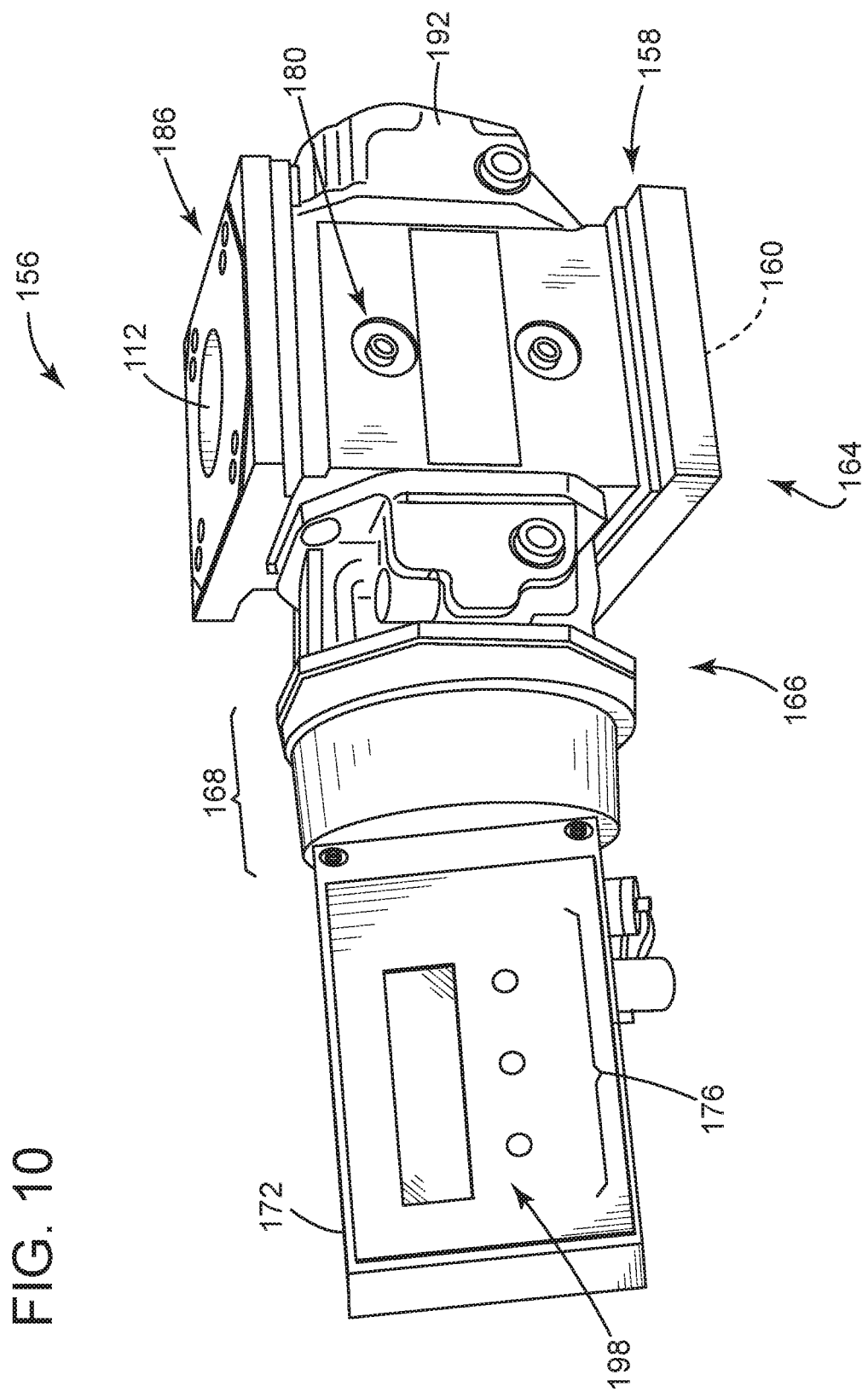
FIG. 10 depicts a perspective view of an example of metrology hardware of FIG. 1 that can receive the manifold 100 as described herein.

FIG. 10 depicts a perspective view of exemplary structure for the metrology hardware 102. The meter body 110 may form a meter body (or fluid coupling) with flanged ends (e.g., a first flanged end 186 and a second flanged end 188). The ends 186, 188 may couple with complimentary features on the conduit 106, like a pipe or pipeline. The meter body may also include openings 190, which may include fittings or other devices or features that receive (or mate with) the inlet fittings 174 on the manifold 100. As also shown, the meter unit 110 may have covers 192 disposed on opposing sides of the device. The covers 192 may provide access to an interior cavity that houses the metering unit 108. One of the covers 192 may feature a connection 194, possibly flanged or prepared to interface with the indexing unit 108, shown here with an index housing 196 having an end that couples with the connection 194. The index housing 196 may comprise plastics, operating generally as an enclosure to contain and protect electronics to generate data for volumetric flow of fuel gas through the meter body 104. The index housing 196 may support an interactive devices 198, like a display and user actionable devices, for example, one or more depressable keys an end user uses to interface with interior electronics to change the display or other operative features of the device.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A gas meter, comprising:
   a meter unit forming a flow path and having openings penetrating into the flow path;
   a manifold attached to the meter body at the openings, the manifold comprising:
   a manifold body of monolithic construction forming an internal pathway with openings to connect with openings on the meter unit, the monolithic construction further forming a pair of opposing arms spaced part from one another on one end, and
   a differential pressure transducer disposed between the opposing arms.

2. The gas meter of claim 1, further comprising:
   valves embedded in the manifold body and interposed between the openings in the internal pathway and the differential pressure transducer.

3. The gas meter of claim 1, further comprising:
   valves with cylindrical bodies embedded in the manifold body to regulate flow through the internal pathway, the cylindrical bodies having a slotted top exposed on one side of the monolithic construction.

4. The gas meter of claim 1, further comprising:
valves having cylindrical bodies embedded in the manifold to prevent flow to through the internal pathway, the valves comprising first and second valves interposed between the openings in the meter unit and opposite ends of the differential pressure transducer.

5. The gas meter of claim 4, further comprising:
a third valve downstream of the first and second valves and coupled upstream of both ends of the different pressure transducer.

6. The gas meter of claim 1, wherein the internal pathway includes first and second portions to direct fluid from the meter unit to opposite sides of the differential pressure transducer, and a third portion coupling the first portion and the second portion.

7. The gas meter of claim 1, further comprising
inserts disposed through the manifold body, the inserts having a central aperture and a radial aperture that intersect, the radial aperture aligning with internal pathway.

8. The gas meter of claim 1, further comprising
an outlet fitting proximate the differential pressure transducer and coupled with the internal pathway.

9. The gas meter of claim 1, further comprising:
an indexing unit coupled with the differential pressure sensor; and
an outlet fitting coupled with the indexing unit and with the internal pathway.

10. The gas meter of claim 1, further comprising:
an indexing unit coupled with the differential pressure sensor, the indexing unit comprising a pressure sensor; and
an outlet fitting coupled with the indexing unit and with the internal pathway to direct flow of fluid from the meter unit to the indexing unit.

11. A manifold, comprising:
a monolithic body having:
an internally drilled fluid pathway comprising:
first and second portions extending longitudinally on either side of the monolithic body, and
a third portion extending laterally and connecting with the first and second portions, and
opposing arms on one end; and
a differential pressure transducer disposed between the opposing arms of the monolithic body and in flow connection with the first and second portions.

12. The manifold of claim 11, comprising:
cylindrical valves wholly embedded in the monolithic body and intersecting with the first and second portions of the internal pathway.

13. The manifold of claim 11, further comprising:
a cylindrical valve wholly embedded in the monolithic body and intersecting with the third portion of the internal pathway.

14. The manifold of claim 11, wherein the monolithic body comprises an opening disposed between the first portion, the second portion, and the third portion and extending entirely through the monolithic body.

15. The manifold of claim 11, further comprising:
an outlet fitting coupled to the outside of the monolithic body and in proximity to the differential pressure sensor, the outlet fitting in flow connection with one of the first or second portions of the internal pathway.

16. The manifold of claim 11, further comprising:
inlet fittings extending into the monolithic body, the inlet fittings coupled with the first and second portions of the internal pathway.

17. The manifold of claim 16, wherein the monolithic body comprises apertures to receive the inlet fittings, the apertures including a first set aligned with the first portion and the second portion of the internal pathway and a second spaced inwardly and apart from the first set, the second set also in flow communication with the first portion and the second portion of the internal pathway.

18. A system, comprising:
a gas meter having a meter body with impellers, the gas meter also having an indexing unit with electronics to convert rotation of the impellers into parameters of flow; and
a manifold coupled to the gas meter to measure differential pressure across the impellers, the manifold comprising a monolithic body with an internally drilled fluid pathway and a differential pressure transducer supported by the monolithic body and communicating with the an internally drilled fluid pathway, both the internally-drilled fluid pathway and the differential pressure transducer coupled with the indexing unit.

19. The system of claim 18, further comprising:
fittings disposed in the monolithic body and aligned with openings in the meter body upstream and downstream of the impellers.

20. The system of claim 18, wherein the manifold comprises three valves, each having a cylindrical body embedded in the monolithic body, two of the valves regulating flow through longitudinal portions of the internal pathway that direct fluid to opposite sides of the differential pressure transducer, and one of the valves regulating flow through a lateral portion of the internal pathway that connects the longitudinal portions.

* * * * *